(12) United States Patent
Kurz et al.

(10) Patent No.: US 8,607,642 B2
(45) Date of Patent: Dec. 17, 2013

(54) HEATED WET GAS FLOW METER

(75) Inventors: Daniel R. Kurz, Salinas, CA (US);
Bruce B. Burton, Royal Oaks, CA (US);
Ralph A. Dalla Betta, Saratoga, CA
(US)

(73) Assignee: Los Robles Advertising, Inc., Monterey, CA (US)

( * ) Notice: Subject to any disclaimer, the term of this patent is extended or adjusted under 35 U.S.C. 154(b) by 183 days.

(21) Appl. No.: 13/329,275

(22) Filed: Dec. 17, 2011

(65) Prior Publication Data
US 2013/0152698 A1 Jun. 20, 2013

(51) Int. Cl.
G01F 1/00 (2006.01)
(52) U.S. Cl.
USPC .......................................... 73/861
(58) Field of Classification Search
USPC .......... 73/861, 202.5, 204.22, 204.27, 114.35
See application file for complete search history.

(56) References Cited

U.S. PATENT DOCUMENTS

| 4,393,702 | A | * | 7/1983 | Kohama et al. ............ 73/204.27 |
| 6,332,356 | B1 | * | 12/2001 | Hecht et al. ................. 73/202.5 |
| 6,851,309 | B2 | * | 2/2005 | Lenzing et al. ............ 73/204.22 |
| 2007/0131279 | A1 | | 6/2007 | Thakre et al. |
| 2008/0196487 | A1 | | 8/2008 | Suzuki |
| 2008/0236274 | A1 | | 10/2008 | Kohno et al. |

FOREIGN PATENT DOCUMENTS

| EP | 0285918 | 10/1988 |
| EP | 0285918 A3 | 10/1988 |

OTHER PUBLICATIONS

International Search Report and Written Opinion, 11 pages.

* cited by examiner

*Primary Examiner* — Jewel V Thompson
(74) *Attorney, Agent, or Firm* — Patent Law Group LLP; David C Hsia

(57) ABSTRACT

A flow body flow meter includes a flow body, a heater, and a sensor. The flow body includes an inlet, an outlet, and an internal passage coupling the inlet and the outlet. The heater evaporates at least some liquid droplets in a stream received by the flow body. The sensor has one or more sensor probes in the flow body to measure a fluid property of the stream.

22 Claims, 8 Drawing Sheets

HEATED WET GAS FLOW METER

CROSS REFERENCE TO RELATED APPLICATIONS

This application is related to U.S. patent application Ser. No. 12/817,211, filed on Jun. 17, 2010, which is commonly assigned and incorporated herein by reference.

FIELD OF INVENTION

This invention relates to methods and apparatus to measure properties of a wet gas flow.

DESCRIPTION OF RELATED ART

Thermal anemometer type flow meters have a very wide dynamic range, 100:1 and in some cases up to 1000:1. In addition, they have good durability, good accuracy, and high repeatability, and they have long proven themselves in the measurement of dry gas flow in a variety of applications. However, thermal anemometer type flow meters are very sensitive to liquid in the gas stream since any liquid contacting the sensor probes will cause a high erroneous reading. Nonetheless, the significant advantages of a thermal anemometer type flow meter make it highly desirable to develop one that can operate in wet gas flows.

BRIEF DESCRIPTION OF THE DRAWINGS

In the drawings.

Use of the same reference numbers in different figures indicates similar or identical elements.

SUMMARY

In one or more embodiments of the invention, a flow measurement system for a duct includes a flow body flow meter. The flow body flow meter receives a stream from a larger stream in the duct. The flow body flow meter includes a flow body with an inlet, an outlet, and an internal passage coupling the inlet and the outlet. The inlet receives the stream and the outlet returns the stream from the flow body back into the duct. The flow body flow meter also includes a heater evaporating at least some liquid droplets present in the stream. The flow body flow meter further includes a sensor having one or more sensor probes in the flow body in a path of the stream.

DETAILED DESCRIPTION

Co-pending U.S. patent application Ser. No. 12/817,211 discloses embodiments of a flow body flow meter for measuring a fluid property, such as flow rate, of a wet gas stream in a pipe or duct. A flow body is a structure placed in or connected to a flow stream within a duct through which a portion of the flow in the duct can pass. A flow body flow meter is a flow body which contains a flow measuring device. A wet gas stream is defined as a gaseous stream that at least intermittently contains liquid droplets (e.g., steam that contains water droplets). The liquid droplets may be the same or different sizes. A portion of the wet gas stream enters the flow body of the meter. The flow body imparts angular momentum to the wet gas stream to drive denser liquid droplets to the outside of the rotating flow, thereby creating a central portion of the rotating flow that is essentially free of the liquid droplets and allowing a sensor in the flow body to measure the flow rate of the wet gas stream. When the imparted angular momentum is low and/or the liquid droplets are small, the liquid droplets may not be effectively separated from the central portion of the rotating flow.

One solution to this problem for a wet gas stream in a given pipe diameter is to reduce the diameter of the pipe to cause a higher flow velocity in the flow body and create a higher angular momentum to provide better separation of the small liquid droplets. However, such a reduced flow pipe diameter would result in an undesirable increase in pressure drop in the pipe. Another alternative solution is to heat the entire wet gas stream to a higher temperature such that all the liquid droplets evaporate and then measure the flow of the single phase gaseous flow. However, this is also undesirable since heating the entire wet gas stream to the temperature necessary to evaporate all the liquid droplets would require an undesirably large energy input and could disrupt the process by changing the stream temperature. Additionally, the costs associated with heating a length of processing piping is expensive and in many cases impractical to vaporize all the liquid droplets in the wet gas stream.

Figure 1:
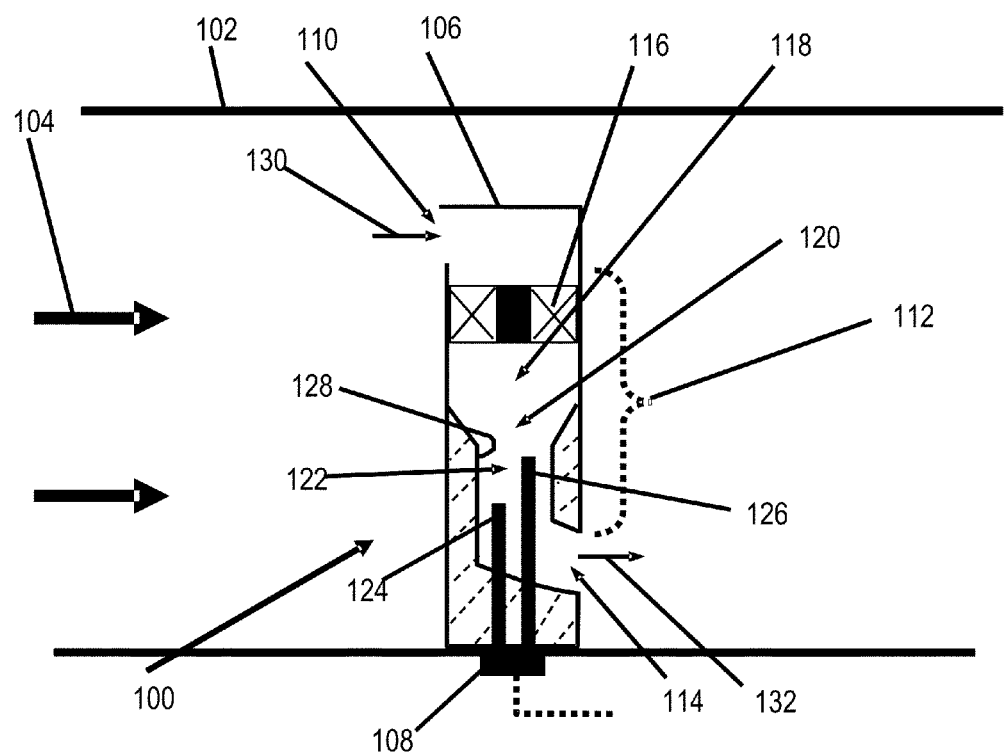
FIG. 1 shows a cross-sectional view of a flow body flow meter representing embodiments of a flow body flow meter.

FIG. 1 shows a cross-sectional view of a flow body flow meter 100 representing embodiments of the flow body flow meter disclosed in U.S. patent application Ser. No. 12/817, 211. Meter 100 is located in a pipe or duct 102 through which flows a wet gas stream 104 that at least intermittently contains liquid droplets (e.g., steam that contains water droplets). Many orientations of duct 102 and meter 100 are possible. In one or more embodiments, meter 100 in mounted normal to the bottom of a horizontal duct 102 so the inlet end is located above the outlet end. However other configurations may have the outlet above the inlet.

Meter 100 includes a flow body 106 and a sensor 108 in the flow body. Flow body 106 is tube like with a lateral inlet port 110, an internal passage 112 downstream from the inlet, and a lateral outlet port 114 downstream from the internal passage. Inlet port 110 faces into stream 104 while outlet port 114 faces away from the stream. The velocity of stream 104 in duct 102 generates a high static pressure at inlet port 110 and a low static pressure at outlet port 114 so that a portion of the flow in the main duct 102 is forced to flow through flow body 106. Internal passage 112 provides a rotational path that imparts angular momentum to a portion 130 of the stream (also called "inlet stream 130") that enters flow body 106 through inlet port 110 and exits from outlet port 114 as a portion 132 of the stream (also called "outlet stream 132").

Sensor 108 is located near the outlet section of flow body 106. Sensor 108 may be a flow sensor, such as a thermal anemometer that can measure mass flow, volumetric flow, or flow velocity. Alternatively, sensor 108 may be a different type of sensor that measures temperature, heat capacity, density, viscosity, humidity, and other fluid properties thus allowing meter 100 to measure these properties without interference from the liquid droplets.

Internal passage 112 includes an axial swirler 116 or another similar device downstream from inlet port 110. Internal passage 112 may further include a wide cylindrical section 118 downstream from swirler 116, a narrowing section 120 downstream from the wide cylindrical section, and a narrow cylindrical section 122 downstream from the narrowing section. Narrowing section 120 reduces the flow area downstream from swirler 116. Narrowing section 120 may reduce the flow area by a contraction ratio (flow cross sectional area of wide cylindrical section 118 divided by flow cross sectional area of narrow cylindrical section 122) of 0.9 to 0.2, 0.8 to 0.4, or 0.7 to 0.4. Narrowing section 120 may have a conical shape. From the outlet end of flow body 106, probes 124 and 126 of sensor 108 extend axially into narrow cylindrical section 122 so they are located near the center axis of the narrow cylindrical section and away from an interior wall 128 of the narrow cylindrical section.

The velocity head of stream 104 causes inlet stream 130 to enter flow body 106 through inlet port 110 and exit outlet port 114 as outlet stream 132. Swirler 116 imparts rotation or angular momentum to the stream inside flow body 106 to drive the denser liquid droplets to the outside away from the gas particles near the center of the rotating flow such that a substantially liquid free portion of the stream flows over sensor probes 124 and 126. This arrangement provides a flow measurement of the stream within flow body 106, which can be related to the flow rate or other fluid properties of stream 104 through calibration curves, graphs, tables, equations, or other similar means.

An example of swirler 116 is later described in reference to FIG. 6. Swirler 116 may be replaced with any structure, flow path, internal passage, or device that imparts angular momentum to inlet stream 130 and causes the denser liquid droplets to be separated from a portion of the stream that flows over sensor probes 124 and 126. Examples of such angular momentum inducing devices include augers, cyclones, angled inlet ports, impactors, and other designs mentioned in U.S. patent application Ser. No. 12/817,211.

The contraction in internal passage 112 from narrowing section 120 may reduce or eliminate any recirculation zone in the center of the stream that develops just downstream of swirler 116. Such a recirculation zone may disturb the flow over sensor probes 124 and 126 of sensor 108 and cause the liquid droplets to impact the sensor probes. The contraction in internal passage 112 may also increase the stream velocity and the rotational velocity to enhance the centrifugal force and thus be more effective in driving the liquid droplets to the outside of the flow path.

As noted above, when the liquid droplets are small and/or the flow velocity is low, the imparted angular momentum may not be sufficient to separate the denser liquid droplets from the gas particles in the center portion of the rotating flow. This allows some of the liquid droplets to impact probes 124, 126 and cause an error in the flow measurement. Embodiments of the present disclosure address this problem by adding heat to inlet stream 130 within a flow body to vaporize at least some of the liquid droplets in the stream.

Embodiments of Heated Flow Body Flow Meter

Figure 7:
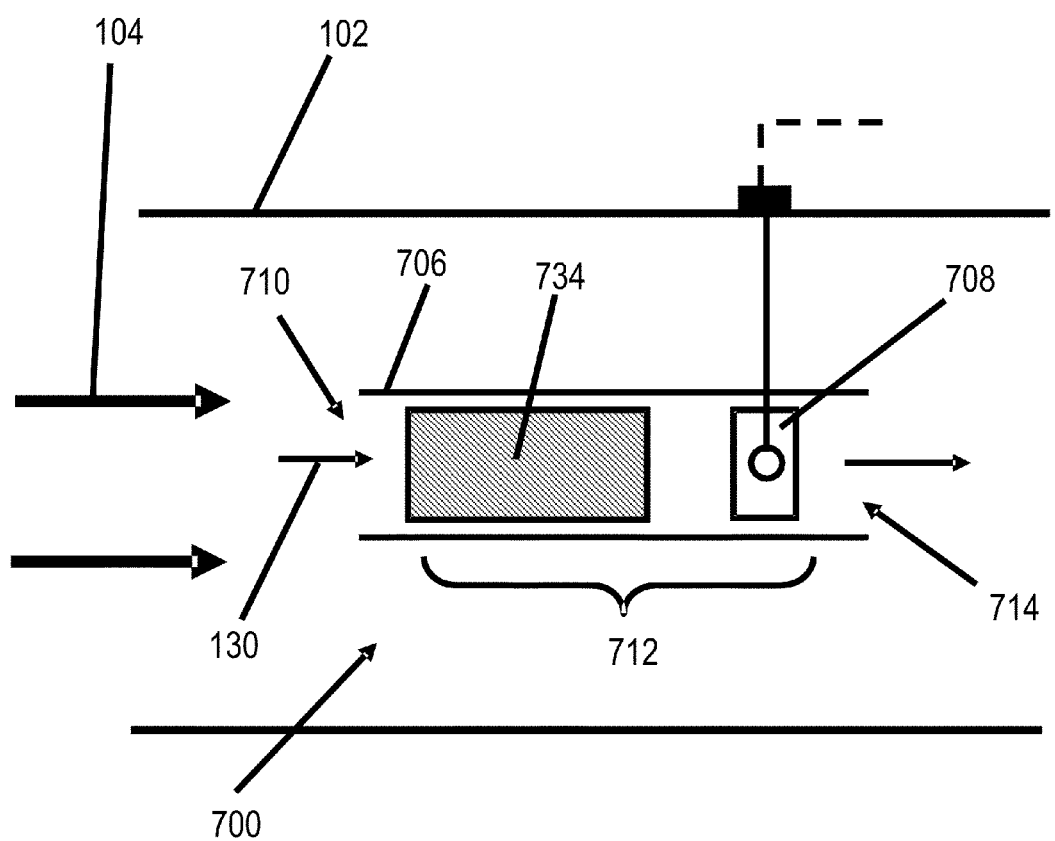
FIG. 7 shows a cross-sectional view of a heated flow body flow meter, all arranged in accordance with embodiments of the present disclosure.

FIG. 7 shows a cross-sectional view of a heated flow body flow meter 700 in one or more embodiments of the present disclosure. Meter 700 is located in duct 102 through which flows wet gas stream 104 that at least intermittently contains liquid droplets. Meter 700 includes a flow body 706 and a sensor 708 in the flow body. Flow body 706 is tube like with an inlet port 710, an internal passage 712 downstream from the inlet, and a lateral outlet port 714 downstream from the internal passage. Inlet stream 130 (e.g., 1 to 20% of stream 104) enters inlet port 710 and exits from outlet port 714 as outlet stream 132. Similar to meter 100, many orientations of duct 102 and meter 700 are possible.

Stream 130 going through flow body 706 first passes through a region 734 that includes one of a heater, a heater combined with a mixer, a heater combined with a liquid droplet separator, or a heater combined with a mixer and a liquid droplet separator. The heater, the mixer, and the liquid droplet separator may be combined in any order, and are hereafter referred to as "component 734." Downstream of component 734 is sensor 708 that measures some property of the flow. Component 734 vaporizes and/or separates the liquid droplets in stream 130 so that the flow over sensor 708 consists of vapor only and the properties measured are the properties of the gas phase. As described above, sensor 708 could be a thermal mass flow meter that is sensitive to liquid droplets. Since component 734 eliminates and/or separates the liquid droplets so that only vapor flow passes over sensor 708, meter 700 may measure mass flow properly. Since the fraction of stream 104 flowing through meter 700 and over sensor 708 is fixed, meter 700 may be calibrated to give an accurate measure of the velocity of stream 104 independent of the presence of liquid droplets in the main stream 104. As will be shown in subsequent figures and in the figures of co-pending U.S. patent application Ser. No. 12/817,211, meter 700 may take a number of different forms and orientations.

Figure 2:
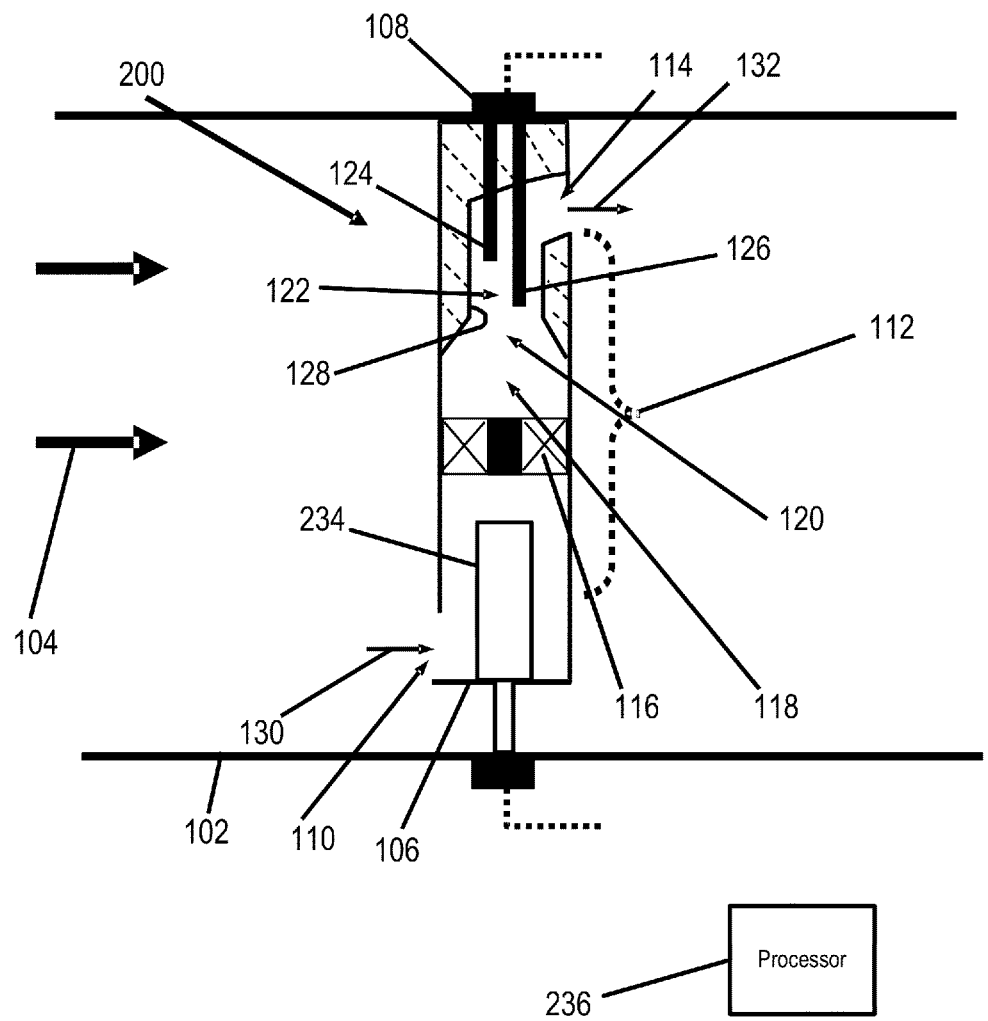
FIG. 2 shows a cross-sectional view of a heated flow body flow meter with a cylindrical heater.

FIG. 2 shows a cross-sectional view of a heated flow body flow meter 200 in one or more embodiments of the present disclosure. Meter 200 is a variation of meter 700 in FIG. 7. Meter 200 is similar to meter 100 in FIG. 1 but inverted so inlet port 110 is located below outlet port 114. More importantly meter 200 includes a cylindrical heater 234 located near the inlet section of flow body 106. Heater 234 may extend axially into flow body 106 from the inlet end. Heater 234 may be a cartridge heater with inner resistance wires that heat the outer heater surface.

Inlet stream 130 enters inlet port 110 and passes around heater 234 before entering swirler 116. Heater 234 adds heat to inlet stream 130 to raise its temperature and vaporize some or all of the liquid droplets in the stream. A small amount of heat may be added to inlet stream 130 to evaporate smaller liquid droplets while larger liquid droplets are separated by swirler 116 from a central portion of the rotating flow. A large amount of heat may be added to stream 130 to vaporize all the liquid droplets. In either scenario, a gaseous flow free of liquid droplets passes over sensor probes 124 and 126 and sensor 108 measures the flow rate of the gaseous flow. A processor 236 is coupled to receive the sensor signals from sensor 108 and control the power input to heater 234. Processor 236 relates the sensor signals to the flow rate or other fluid properties of stream 104 through calibration curves, graphs, tables, equations, or other similar means.

For situations where there is a high flow velocity in duct 102 and the liquid droplets are not too small in diameter, the velocity head generates sufficient flow velocity in flow body 106 such that swirler 116 or another similar device imparts a high rotational velocity to inlet stream 130 within the flow body to drive substantially all the liquid droplets to interior wall 128 of the flow body and allow only a gaseous flow to contact sensor probes 124 and 126. Under such conditions, where the flow velocity is above a threshold and the droplet size is sufficiently large, swirler 116 imparts sufficiently high angular momentum to inlet stream 130 within flow body 106 such that substantially all the liquid droplets are removed from the gaseous flow and no heating of the stream is needed. The flow rate range where swirler 116 induces sufficient angular momentum varies with the liquid droplet size. For a large droplet size, the flow rate range for which swirler 116 is sufficient may extend to relatively low flow rates. For a small droplet size, the minimum flow rate to remove substantially all the liquid droplets from the gaseous flow may be much higher.

Since inlet stream 130 passing through flow body 106 is a small fraction of the main stream 104, the energy input to heater 234 should be small. In addition, when outlet stream 132 is returned to the main stream 104, the change in temperature of the main stream should be negligible.

Locating inlet port 110 below outlet port 114 helps to avoid the "chimney" effect in low flow situations where the flow rises when the driving force from stream 104 is unable to push stream 130 down flow body 106. The chimney effect may be amplified by the presence of heater 234, which creates a heat plume that rises and pushes against stream 130.

Figure 3:
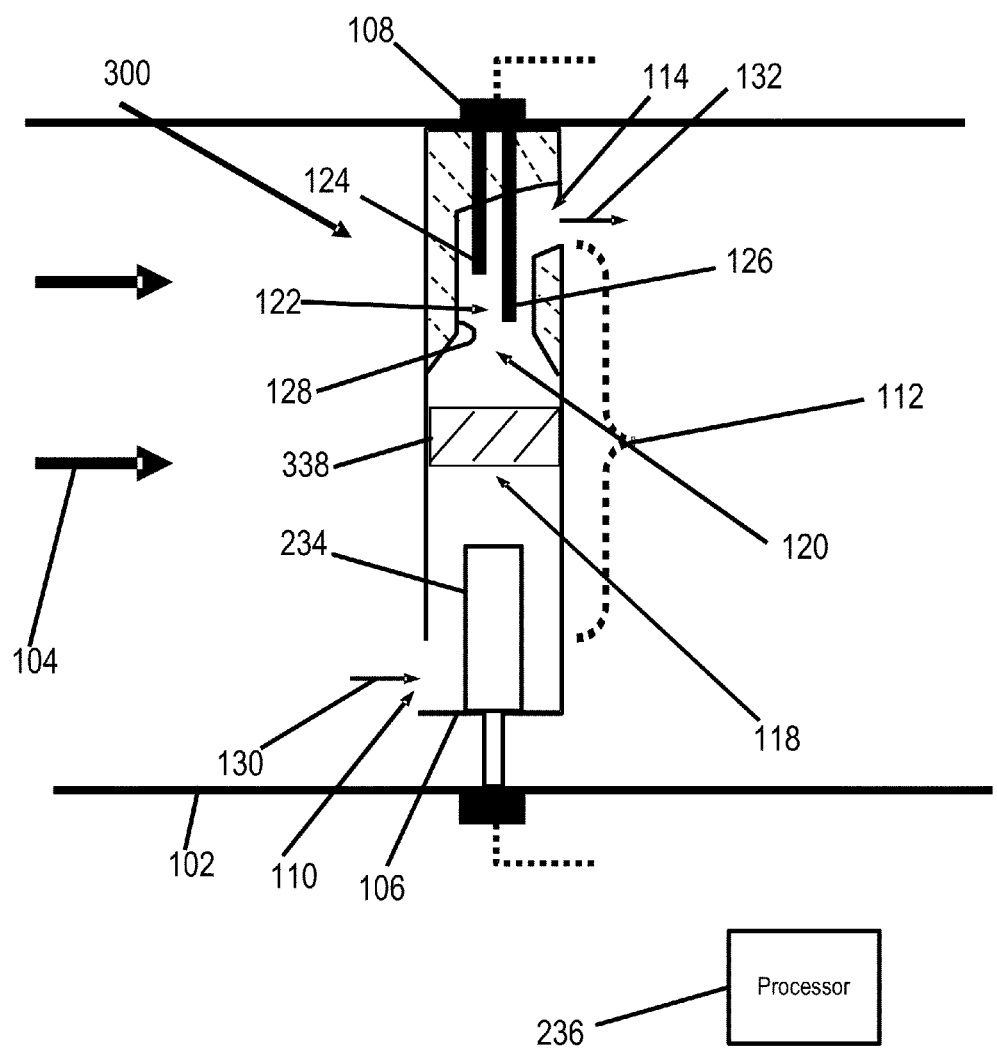
FIG. 3 shows a cross-sectional view of a heated flow body flow meter without a swirler.

FIG. 3 shows a cross-sectional view of a heated flow body flow meter 300 in one or more embodiments of the present disclosure. Meter 300 is similar to meter 200 in FIG. 2 but uses heater 234 without swirler 116. Meter 300 may be used for low flow rates and small liquid droplets. Meter 300 may also be used for larger liquid droplets if the temperature rise is sufficiently high. Heater 234 raises the temperature of inlet stream 130 flowing into inlet port 110. This increased temperature vaporizes the small liquid droplets before they can reach sensor probes 124 and 126 so that sensor 108 measures a gaseous flow and is not influenced by the liquid droplets in inlet stream 130. In one or more embodiments, meter 300 may include an optional static mixer 338 downstream of heater 234 so that the gaseous flow over sensor probes 124 and 126 is well mixed with minimal variations in temperature. In one or more embodiments, the cross-sectional area of inlet port 110 is sized to reduce the flow within flow body 106, thereby allowing heater 234 to effectively vaporize the liquid droplets at higher flow rates and allowing operation at higher flow velocities. Meter 300 may also be used in streams with larger liquid droplets as long as the temperature rise is large and/or residence time of the heated flow region in flow body 106 is sufficiently long such that the larger droplets will be substantially vaporized.

Heating stream 130 within flow body 106 to vaporize the liquid droplets and then measuring the gaseous flow may give a different mass flow measurement compared to a swirler or other similar device that separates the liquid droplets from the gaseous flow and then measures the mass flow of the gaseous flow. In the first case, when inlet stream 130 is heated sufficiently to vaporize all the liquid droplets, the measured mass flow may be the sum of the gaseous flow and the liquid flow and may in effect give a flow reading equal to the total flow within flow body 106. In the second case, when inlet stream 130 is not heated and the liquid droplets are separated by a swirler, the measured mass flow may be the mass flow of the gaseous flow only. These two mass flow measurements may not be significantly different for most applications of interest where the mass flow of the liquid flow is generally small, typically 2 to 3% or less. However, even in cases where the liquid mass fraction is higher, the embodiments of the present disclosure allow a measurement of the mass flow without the effects from the presence of the liquid droplets that otherwise make any measurement of mass flow difficult or impossible or necessitate the use of more expensive flow measurement instrumentation.

Figure 4A:
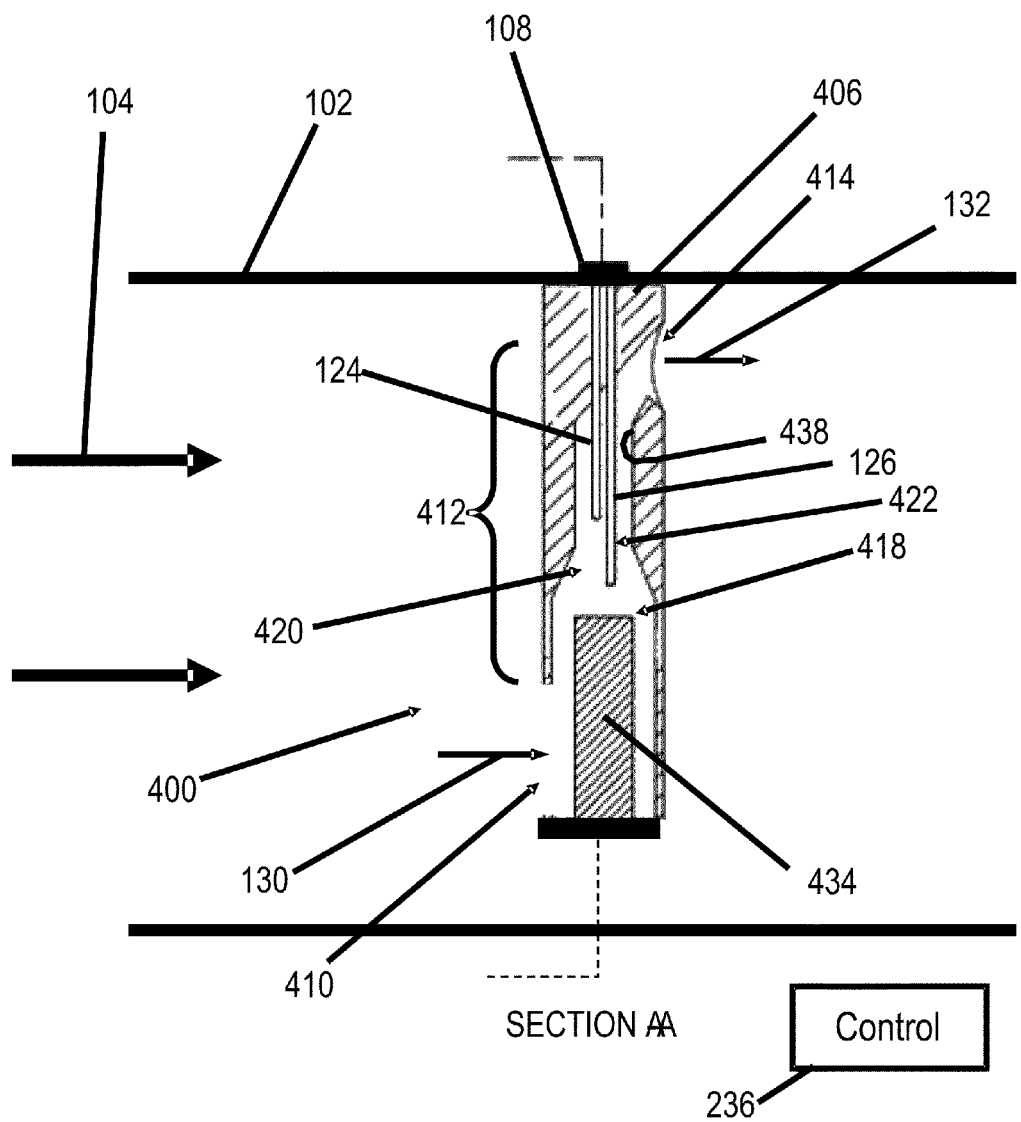
FIGS. 4A, 4B, and 4C show cross-sectional, front, and isometric views of a heated flow body flow meter with the inlet designed as an impactor.
Figures 4B, 4C:
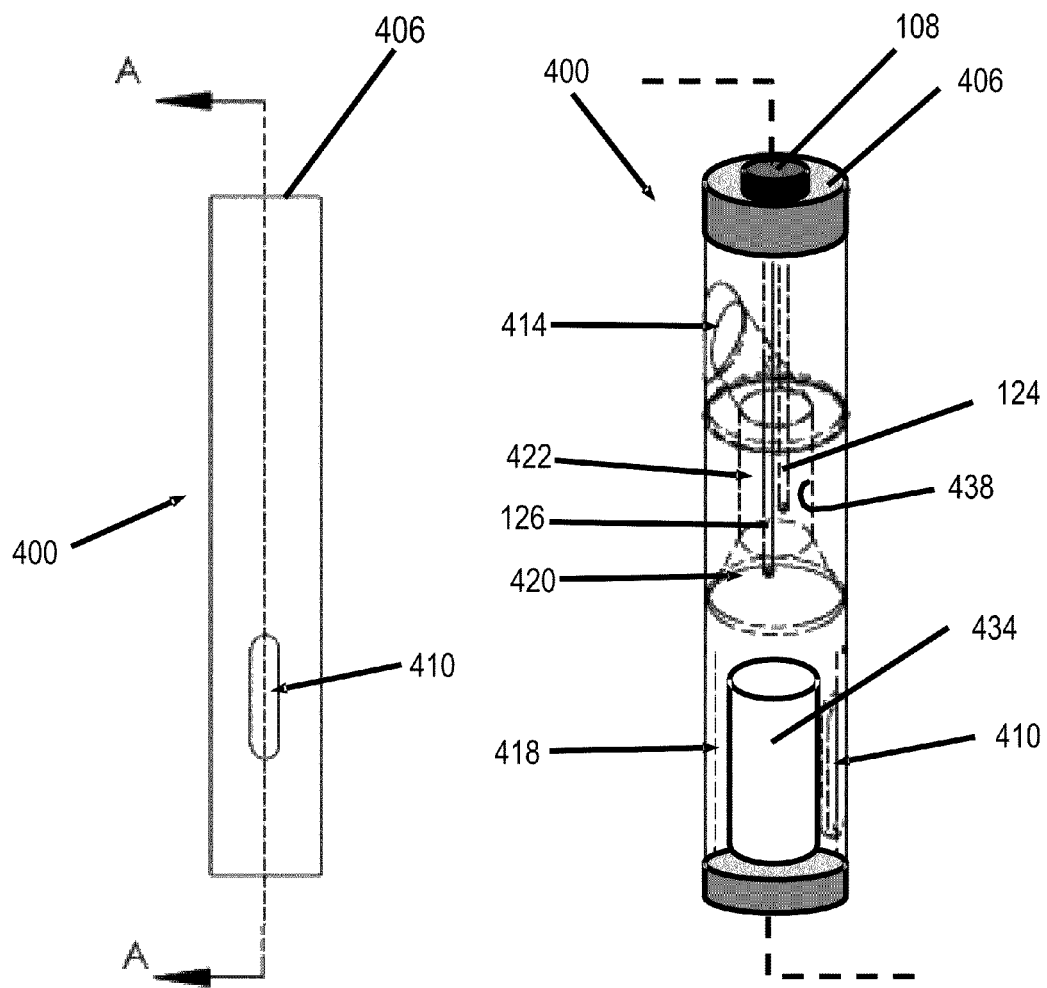

FIGS. 4A, 4B, and 4C show cross-sectional, front, and isometric views of a heated flow body flow meter 400 in one or more embodiments of the present disclosure. Meter 400 uses an inlet designed as an impactor to separate liquid droplets from gas particles inside the meter. Meter 400 is located in pipe or duct 102 through which flows stream 104 that at least intermittently contains liquid phase droplets. Many orientations of duct 102 and meter 400 are possible. In one or more embodiments, meter 400 is mounted normal to the top of a horizontal duct 102 so the inlet end is located below the outlet end.

Meter 400 includes a flow body 406 and sensor 108 in the flow body. Flow body 406 is tube like with a lateral inlet port 410, an internal passage 412 downstream from the inlet, and a lateral outlet port 414 downstream from the internal passage. Inlet port 410 faces substantially into stream 104 while outlet port 414 faces substantially away from the stream. Inlet port 410 is a long narrow slot oriented along the length of flow body 406. A cylindrical heater 434 extends axially into flow body 406 from the inlet end. Sensor 108 is located near the outlet section of flow body 406.

Internal passage 412 includes a wide cylindrical section 418, a narrowing section 420 downstream from the wide cylindrical section, and a narrow cylindrical section 422 downstream from the narrowing section. Narrowing section 420 may reduce the flow area by a contraction ratio of 0.9 to 0.2, 0.8 to 0.4, or 0.7 to 0.4. Narrowing section 420 may have a conical shape. Sensor probes 124 and 126 extend axially into narrow cylindrical section 422 so they are located near the center axis of the narrow cylindrical section and away from an interior wall 438 of the narrow cylindrical section.

Cylindrical heater 434 extends axially into wide cylindrical section 418. To form an impactor, cylindrical heater 434 is dimensioned so the annular separation between the inner diameter of wide cylindrical section 418 and the outer diameter of the cylindrical heater is small enough so inlet stream 130 entering through inlet port 410 makes an abrupt turn to pass around the cylindrical heater. This abrupt turn imparts angular momentum to the flow stream so the denser liquid droplets continue in an essentially straight line and impact cylindrical heater 434 while the gas particles flow around the cylindrical heater and then up through the rest of internal passage 412. The ratio between the dimensions of (1) the width of inlet port 410, (2) the annular gap between the inner diameters of flow body 406 at the region of heater 434 and the outer diameter of the heater, and (3) the inner diameter of the flow body at the region of the heater may be 0.05/0.05/1, 0.1/0.1/1, or 0.25/0.25/1.

Cylindrical heater 434 also adds heat to inlet stream 130 flowing through flow body 406 and thus vaporizes the liquid droplets. The resulting flow into narrow cylindrical section 422 is substantially free of the liquid droplets so that a gaseous flow passes over sensor probes 124 and 126 and sensor 108 measures the flow rate of the gaseous flow. Alternative impactor designs may be used instead of cylindrical heater 434. For example, an impactor may divert the flow through a sharp angle causing the higher density liquid droplets to impact a heated surface.

Processor 236 is coupled to receive the sensor signals from sensor 108 and control the power input to heater 434. Processor 236 relates the sensor signal to the flow rate or other fluid properties of stream 104 through calibration curves, graphs, tables, equations, or other similar means.

Figure 5:
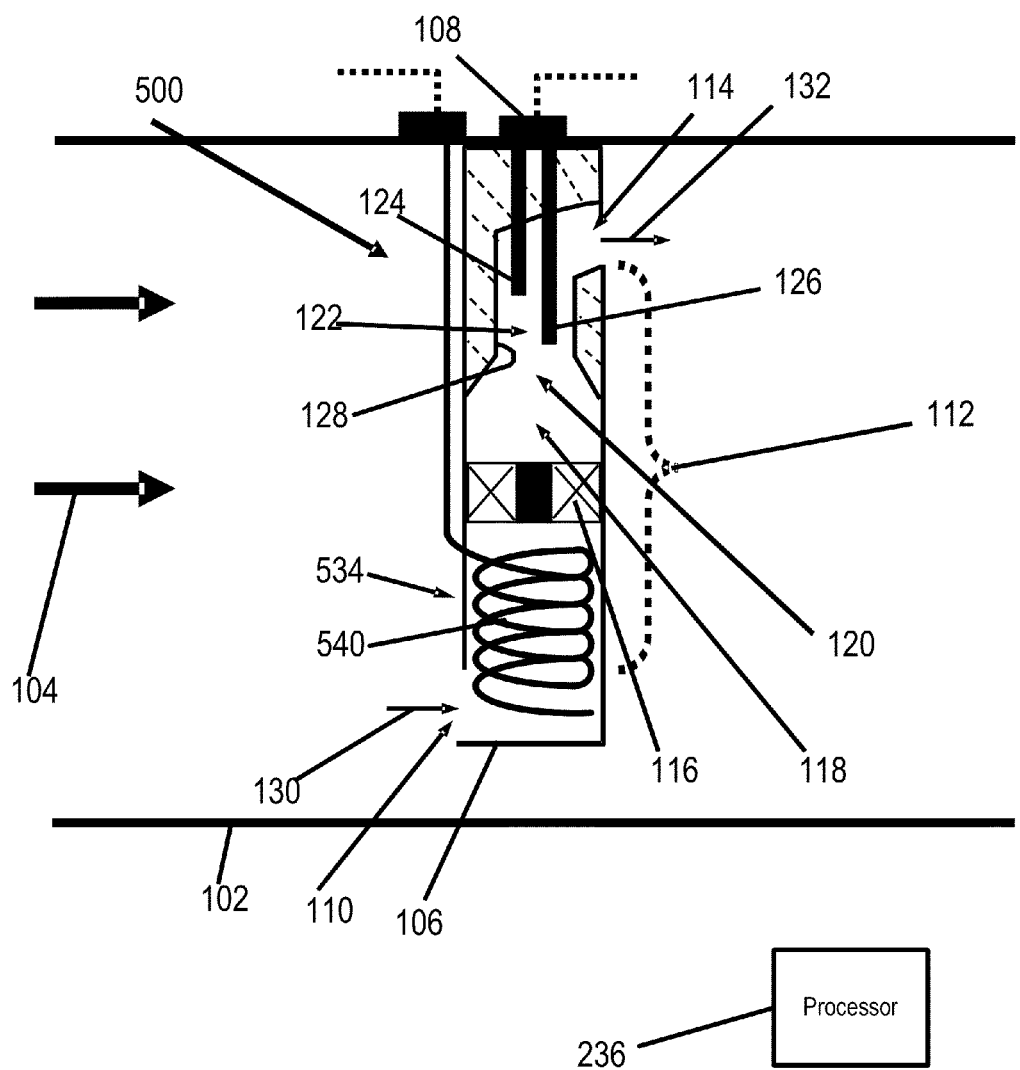
FIG. 5 shows a cross-sectional view of a heated flow body flow meter with a metal tube heater.

FIG. 5 shows a cross-sectional view of a flow body flow meter 500 in one or more embodiments of the present disclosure. Meter 500 is similar to meter 200 in FIG. 2 but uses a heater 534 instead of a cylindrical heater 234. Heater 534 may be composed of a long metal tube that contains an electrical heating element through which an electric current is passed to heat the entire length of the long metal tube. Heater 534 may extend along the external surface of flow body 106 and enter the inlet section of the flow body or may be incorporated into the internal structure of flow body 106. Within the inlet section of flow body 106, heater 534 has a section 540 that is wound in a spiral fashion to provide a large heated surface area to contact stream 130. Heater 534 may have a heated surface along its entire length or just in section 540 inside the inlet section of flow body 106. The shape of heater 534 may also take other forms, such as a spiral, small diameter spirals within larger spirals, zigzag shapes, square shapes, or other shapes that expose a large surface area to heat inlet stream 130. Heater 534 may have a round cross section, a square cross section, or a flat cross section. Heater 534 may also contain an internal thermocouple with separate leads to allow the measurement of the temperature of the heater at one or more locations. Additionally, heater 534 may contain a heater wire whose resistance changes with temperature so that the temperature or average temperature of the heater wire can be determined by measuring the resistance of the heater wire. In addition, this resistance measurement can be used to control the power to the heater wire.

Figure 6:
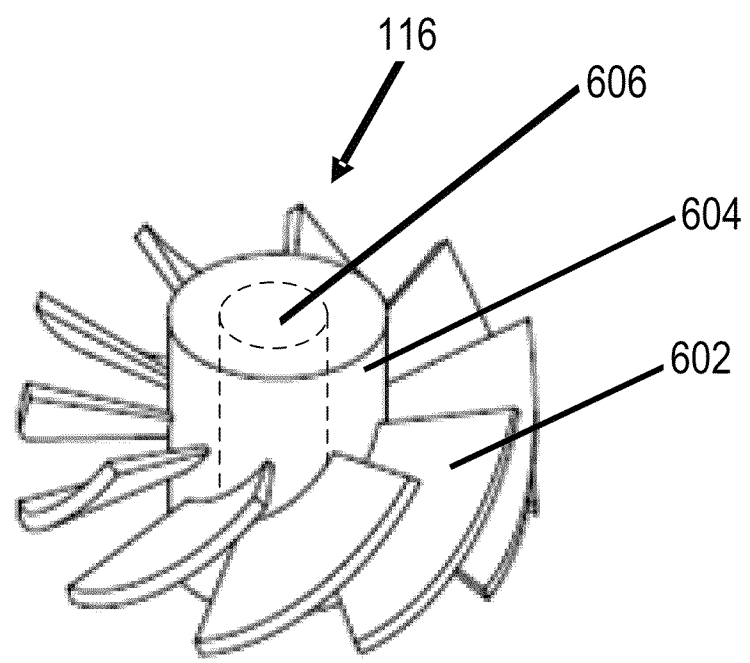
FIG. 6 shows an isometric view of a swirler.

FIG. 6 shows a swirler 116 of meters 200 and 500 (FIGS. 2 and 5) in one or more embodiments of the present disclosure. Swirler 116 has angled vanes 602 arrayed around the outside of a central hub 604. In one or more embodiment, swirler 116 may be heated by placing a heater 606 in central hub 604 so that vanes 602 are heated and then vanes 602 heat the flow through flow body 106. Swirler 116 may be used in addition or as an alternative to heaters 234 and 534 in meters 200 and 500, respectively.

In one or more embodiments of the present disclosure, a heater element is affixed to the inlet section of a flow body to heat the flow body itself. Stream 130 contacts the inside surface of flow body and is thereby heated. The method of heating the flow body may take many forms. For example, a cartridge heater (such as heater 234 in FIG. 2) may be affixed to the external surface of the flow body or a wire type heating element (such as heater 534 in FIG. 5) may be wrapped around the external surface of the flow body. Alternatively the heater may be a heater circuit that passes an electric current directly through a conductive flow body or a portion of the flow body to directly heat the flow body by resistive heating.

In one or more embodiments of the present disclosure, the heater element is a thin film heater. A thin film heater has a thin metal film deposited on a substrate and receives an electric current through the metal film to heat the metal film and the substrate. The thin film heater may be affixed to the interior of the flow body so that it heats both the inlet stream and the flow body, or the thin film heater may be affixed to the exterior of the flow body so that it heats the flow body and the flow body interior surface heats the inlet stream within the flow body.

The thin film heater may be constructed of a metal film on a ceramic substrate, a polymer substrate, or a composite substrate such as fiberglass reinforced plastic typically used in circuit boards. The metal film may be any electrically conductive material. The metal film may be of a metal or an oxide of a metal such as nickel, copper, silver, gold, platinum, palladium, or an alloy of these metals. The metal film could be deposited in a single trace, a zigzag trace, or in any form desired to provide resistive heating in the location desired.

In one or more embodiments of the present disclosure, alternative means of heating inlet stream 130 in a flow body includes microwave radiation, infrared radiation, laser light, circulating flow of a higher temperature heat transfer fluid, or other means of applying energy to the inlet stream itself or the inlet section of the flow body that are common in the art. If the liquid phase droplets in inlet stream 130 consist substantially of water or hydrocarbons, then microwave or infrared frequency could be tuned to provide heat directly to the liquid phase droplets.

The embodiments in FIGS. 1 through 5 show a thermal anemometer type flow sensor employing two probes with one which measures the stream temperature and one which is heated. The signals derived from these sensor probes are then related to fluid properties through calibration curves, graphs, tables, equations, or other similar means. U.S. Pat. Nos. 7,418,878 and 7,647,843 describe a multitude of strategies for operating such a thermal anemometer flow sensor. The flow body flow meters described herein can be used with other types of flow measurement technologies. For example, the flow in regions 120, 122 (FIG. 1) or 418, 420 (FIG. 4) that is free of liquid droplets may incorporate an ultrasonic flow measurement device, a vortex shedding flow measurement device, an orifice or venturi combined with one of more pressure sensors to measure pressure drop, or other flow measurement sensor technologies.

Temperature Compensation in the Flow Measurement Algorithm

All flow meters show some effect of stream temperature on the flow measurement. For this reason, a flow meter that heats the stream will require that the flow reading be corrected for changes in the stream temperature. Thus, the embodiments of the flow meters in the present disclosure may include a temperature compensation algorithm in processor 236 to apply to the sensor signals to give a corrected flow value. The correction algorithm may be a correction factor dependent only on the temperature, a correction table dependent on both the temperature and the flow rate, or a mathematical expression that includes temperature, flow, and other factors such as temperature rise due to heating of the gas stream, power input to the heater, heat loss from the heater, and other factors. The correction algorithm may be determined through calibration using known parameters.

Control Algorithms

In the embodiments of the present disclosure, processor 236 controls the application of heat to inlet stream 130 flowing through a flow body using a variety of methods. Processor 236 may hold the power input fixed or varied as a function of the flow rate measured by sensor 108. It is noted that by controlling the power input to the heater at a fixed level, the temperature rise of flow stream 130 would depend on the flow rate since at low flow rates the temperature rise is higher. It is the lower flow rate situation where a larger temperature rise is needed to evaporate liquid droplets that cannot be separated from the gaseous flow by the swirler, the impactor, or another similar device. Alternatively, processor 236 holds the heater power low at a low flow rate and increases the heater power as the flow rate increases. In one or more embodiments, processor 236 adjusts the heater power to obtain a target temperature. For example, one of sensor probes 124 and 126 may be a temperature sensor that measures the temperature of stream 130 flowing through the flow body. Processor 236 then adjusts the heater power to obtain a target temperature at the temperature sensing probe. This target temperature may be a function of the measured flow rate.

In one or more embodiments, a temperature sensor separate from sensor 108 is used to measure the temperature of inlet stream 130 and processor 236 adjusts the heater power to obtain a target temperature at sensor probes 124 and 126 so the target temperature represents a target temperature rise in the inlet stream. The temperature rise may be a function of the measured flow rate.

In one or more embodiments where a meter includes both a swirler and a heater (e.g., meter 200 in FIG. 2), processor 236 operates the heater at constant power such that the heater provides sufficient heat to vaporize substantially all the liquid droplets but especially the small liquid droplet at low gas flow rates within the flow body. As the fluid velocity in the duct or pipe increases and the flow rate within the flow body increases, the added heat becomes insufficient to vaporize the smaller liquid droplets but the flow velocity becomes sufficiently high such that the angular momentum induced by the swirler separates the liquid droplets from the gas particles, thereby allowing the measurement of the gaseous flow.

In one or more embodiments, a meter incorporates temperature measurements at the inlet and the outlet of the flow body and processor 236 adjusts the power to the heater to obtain a target outlet temperature that is a fixed value, a function of the inlet temperature, a function of the flow rate, or a function of other characteristics of the flow stream. The meter may include temperature sensors at the inlet and the outlet of the flow body. Alternatively, the outlet temperature measurement may be performed by one of sensor probes 124 and 126.

Flow Meter Orientations

U.S. patent application Ser. No. 12/817,211 describes a number of different designs for a flow body flow meter including designs that orient the flow body vertical up from the bottom of the duct, designs that orient the flow body vertically down from the top of the duct, designs that orient the flow body co-linearly with the flow in the duct, designs that place the flow body in a side passage with a portion of the flow in the main duct passing outside the duct and through the flow body, etc. All of the different designs may use the flow meters described herein.

Various other adaptations and combinations of features of the embodiments disclosed are within the scope of the invention. Numerous embodiments are encompassed by the following claims.

The invention claimed is:

1. A flow measurement system for a duct, comprising:
 a flow body flow meter receiving a stream that is a small portion of a larger stream in the duct, the flow body flow meter comprising:
  a flow body comprising an inlet, an outlet, and an internal passage coupling the inlet and the outlet, wherein the inlet receives the stream and the outlet returns the stream from the flow body back into the duct;
  a heater evaporating at least some liquid droplets present in the stream flowing through the flow body; and
  a sensor having one or more sensor probes in the internal passage, wherein the sensor measures a property of the stream.

2. The system of claim 1, wherein the one or more sensor probes are in a path of a portion of the stream that is substantially free of the liquid droplets.

3. The system of claim 1, the internal passage comprises a rotational path imparting angular momentum to the stream to induce a rotating flow.

4. The system of claim 1, wherein the heater is a cylindrical heater that extends axially into the flow body from an inlet end of the flow body.

5. The system of claim 1, wherein the heater is a metal tube heater having a portion within the internal passage upstream from the sensor probes.

6. The system of claim 1, wherein the heater comprises a circuit connected to pass a current through the flow body to resistively heat the flow body.

7. The system of claim 1, wherein the heater is a resistance heater, a thin film heater, a microwave heater, an infrared radiation heater, a laser heater, or a heat exchanger circulating a higher temperature heat transfer fluid.

8. The system of claim 1, further comprising a processor, the processor being programmed to control a power input to the heater based on one or more of a first temperature of the stream at the inlet, a second temperature of the stream inside the flow body, a third temperature of the stream at the outlet, and a flow rate of the stream within the flow body.

9. The system of claim 1, further comprising a processor, the processor being programmed to provide a constant power input to the heater.

10. The system of claim 1, wherein a separation between an inner diameter of an inlet section of the flow body and an outer diameter of the heater is dimensioned so the heater forms an impactor to the stream entering through the inlet so at least a portion of the liquid droplets continue in a substantially straight line and impacts the heater while gas particles in the stream flow around the heater.

11. The system of claim 10, wherein the inlet is a slot oriented along a length of the flow body, the internal passage comprises a wide cylindrical section coupled to the inlet, a narrow cylindrical section, a narrowing section coupling the wide and the narrow cylindrical section, and the heater is located in the wide cylindrical section.

12. The system of claim 1, wherein the flow body flow meter further comprises an angular momentum inducing device in the internal passage, the angular momentum inducing device is an axial swirler, an auger, or a cyclone.

13. The system of claim 12, wherein the heater is a cylindrical heater that extends axially into the flow body from an inlet end of the flow body.

14. The system of claim 12, wherein the axial swirler comprises a hub and angled vanes arrayed around the hub, and the heater is located in the hub.

15. The system of claim 12, wherein the internal passage further comprises a narrowing section downstream from the axial swirler and upstream from the sensor.

16. The system of claim 1, wherein the flow body flow meter further comprises at least one of a first temperature sensor near the inlet and a second temperature sensor near the outlet.

17. A method, comprising:
 diverting a stream from a larger stream, the stream being a small portion of the larger stream;
 heating the stream to evaporate at least some liquid droplets present in the stream;
 measuring a property of the stream with a sensor having one or more sensor probes in a portion of the stream that is substantially free of the liquid droplets; and
 returning the stream to the larger stream.

18. The method of claim 17, wherein diverting comprises diverting the stream through a flow body, the method further comprising controlling said heating of the stream based on one or more of a first temperature of the stream at an inlet of the flow body, a second temperature of the stream inside the flow body, a third temperature of the stream at an outlet of the flow body, and a flow rate of the stream within the flow body.

19. The method of claim 17, wherein said heating the stream comprises providing a constant heating power.

20. The method of claim 17, further comprising directing the stream onto a heater so the liquid droplets continue in a substantially straight line and impacts the heater while gas particles in the stream flow around the heater.

21. The method of claim 17, further comprising imparting angular momentum to the stream to induce a rotating flow, wherein the angular momentum forces the liquid droplets to a periphery of the rotating flow.

22. The method of claim 21, further comprising contracting a flow area downstream after providing the rotational path and upstream from measuring the property.

* * * * *